Figure 1:
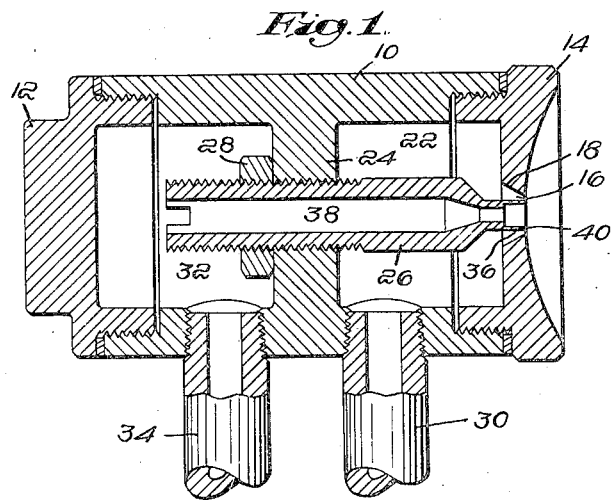
Figure 2:
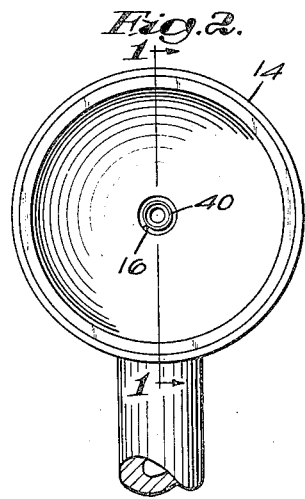
Figure 3:
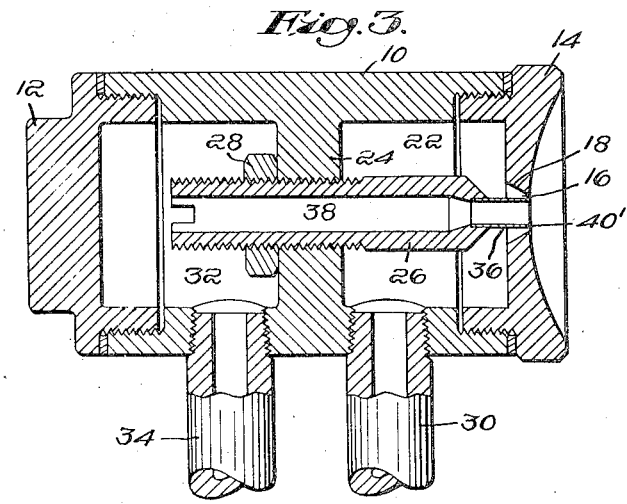
Figure 4:
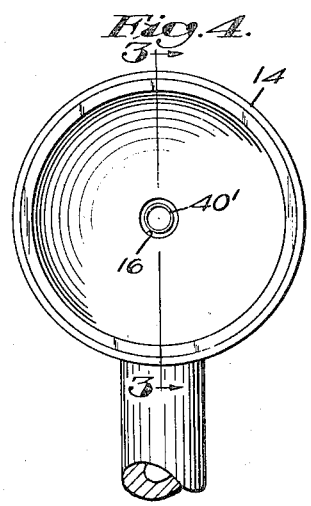

Oct. 24, 1944.   A. J. LOEPSINGER   2,361,144
METHOD OF ATOMIZING LIQUIDS
Filed April 7, 1941

Albert J. Loepsinger,
Inventor:
By Harry Dexter Peck
Attorney

Patented Oct. 24, 1944

2,361,144

UNITED STATES PATENT OFFICE 2,361,144

METHOD OF ATOMIZING LIQUIDS

Albert J. Loepsinger, Providence, R. I., assignor to Grinnell Corporation, Providence, R. I., a corporation of Delaware Application April 7, 1941, Serial No. 387,172

5 Claims. (Cl. 299—142)

This invention relates to an improved method of atomizing a liquid. More especially it has to do with atomizing a liquid by means of a fluid moving at high velocity which first transforms a slowly moving solid stream of the liquid into a faster moving coherent hollow stream, then further increases the velocity of the liquid and attenuates it into fine filaments, and finally disperses the liquid as minute droplets resulting from a break up of the attenuated filaments under the influence of surface tension.

A principal object of the invention is to produce extremely fine droplets with less expenditure of energy than has heretofore been possible. This object is accomplished by a novel presentation of the liquid to the atomizing fluid.

The improved method is particularly adapted to the humidification of the air in textile establishments where a number of atomizing devices are distributed within the space to be humidified and accomplish their purpose by dispersing fine droplets of water directly into the atmosphere. In such an arrangement compressed air is employed as the atomizing fluid and the desirability for effecting economy in initial cost of the compressing means, maintenance and running expense is obvious. Such economy may be effected according to the method described herein by using air at lower pressure or less air at higher pressure or both.

Humidification is accomplished by evaporation of fine droplets into water vapor, a conversion that must often take place under unfavorable circumstances of high relative humidity and comparatively low temperature. Hence, it is of the utmost importance that the dispersed droplets be very small so that evaporation is complete before any of them come in contact with machinery or work in process. Such extremely fine atomization is unnecessary and occasionally undesirable in most other applications of atomizing devices, as, for example, in spray nozzles for coating surfaces with paint or lacquer and for liquid fuel burners.

To distinguish the degree of atomization produced by the method herein disclosed the atomized liquid is described as being the dispersed phase of the colloidal state, the atmosphere constituting the dispersing phase. It is to be understood that these terms are used in the same sense as when applied to a natural fog, for example, and not to the ultimate degree of dispersal involving Brownian movements.

The method is most easily practiced with that type of atomizer in which the liquid is drawn through a nozzle having an unobstructed open discharge outlet by the aspirating action of an annular stream of the atomizing fluid surrounding the outlet. Its chief novelty is the manner in which the stream of liquid within the nozzle is made to change its cross-section form. Specifically, the liquid enters the nozzle as a solid stream and leaves it as a thin hollow annulus adhering to the inner wall of the nozzle. To accomplish this the discharge outlet of the nozzle is preferably so designed and positioned with respect to the influence of the atomizing fluid that the velocity of the liquid is accelerated within the nozzle with resulting diminished cross-section area. The accelerated stream clings to the inner wall of the nozzle and assumes the annular form because of the spreading effect of the fluid stream and of the adhesive attraction between the wall of the nozzle and the liquid.

I am aware that in some forms of atomizing nozzles a thin annular film of liquid has been produced by causing the liquid to flow along the external surface of an element located along the axis of and near the end of the liquid discharge outlet. Such a mechanically formed and guided film is not hollow in the sense in which I employ the term, because by hollow stream I mean a thin annular coherent film of liquid with nothing within it except air and/or the vapor of the liquid.

Having produced the hollow stream of liquid, the successful practice of my method further requires that the atomizing fluid, while coming in close contact with the liquid, should not force the liquid into a bottle-neck form after it has emerged from the discharge end of the nozzle. Should this occur the fine droplets coalesce with resulting coarse particles.

So far as I am aware, in methods of atomization previously employed the liquid is presented to the atomizing fluid as a solid stream, or as an annular film flowing along an internal guiding element, or in large elongated droplets, or as coarse filaments. The advantage of my method resides in the fact that much less energy need be expended by the atomizing fluid on a thin annular hollow stream to produce the desired colloidal state of the liquid than is the case when the stream is solid or is an annular film flowing along an internal surface or is in the form of large droplets or coarse filaments.

The conditions necessary to practice this invention are critical and depend primarily upon the size and form of the nozzle for the liquid and, to a lesser extent, for the fluid and the position of one with respect to the other. While these sizes, forms and positions must finally be determined by testing for the best results, it is to be noted that the area of the liquid discharge outlet should be approximately twice that commonly employed when the liquid emerges as a solid stream, and the rate of discharge adjusted to that desired by changing the aspirating effect of the atomizing fluid on the liquid. This is conveniently done by adjusting the position of the discharge end of the liquid nozzle with respect to the stream of atomizing fluid. An atomizer that has been constructed and adjusted to practice the method of my invention may readily be distinguished from others by the fine quality of atomization produced, the small amount of atomizing fluid required, and by the appearance as the liquid leaves its discharge outlet of a substantially transparent hollow stream of liquid of appreciable length.

Atomizers by which my improved method may be successfully practiced are shown in the accompanying drawing but this is to be deemed merely illustrative for it is intended that the patent shall cover by suitable expression in the appended claims whatever features of patentable novelty exist in the invention disclosed.

In the accompanying drawing:

Figure 1 is a medial vertical section, taken as on line 1—1 of Figure 2, of an atomizer constructed and arranged to operate in accordance with the principles of my present invention;

Figure 2 is a front elevation of the same;

Figure 3 is a similar section, taken as on line 3—3 of Figure 4, showing a modification; and Figure 4 is a front elevation of the atomizer of Figure 3.

Referring more particularly to the drawing and especially to Figure 1, the atomizer shown for illustration is one in which the air and water outlets are arranged concentrically, but this particular arrangement is not deemed necessary in employing the essence of my invention. The atomizer shown has a body 10 the rear end of which is closed by a plug 12. The forward or discharge end is provided with a plate 14 which is screwed into the body and has a central aperture 16. This opening has a short converging wall 18 about midway of the plate 14 from the forward edge of which wall the front surface of the plate is dished outward. Back of the plate 14 is a chamber 22 formed by the body 10, a partition 24 therein, the plate 14 and a water nozzle 26 which is shown threaded through the partition 24 and locked in position by a nut 28. Air under pressure is supplied to the air chamber 22 by a pipe 30 connected with suitable air compressing apparatus not shown. Rearward of the partition 24 is another chamber 32 which is connected by a pipe 34 with a convenient supply of water under atmospheric pressure.

When the air is turned on and flows into chamber 22 and thence through the annular passageway between the wall 18 and the cylindrical outer surface 36 of the water nozzle, it creates a suction or aspirating effect at the end of the latter which draws the water from its supply into chamber 32 and thence along a passageway 38 through the water nozzle. This water flows as a slowly moving solid stream until it nears the discharge outlet of the nozzle and is transformed into a thin hollow coherent stream. This transformation is effected primarily by the influence of the very rapidly moving annular stream of air and is aided by the adhesion between the inner wall of the nozzle and the water. The rapidly moving air creates a low pressure condition at the edge of the water outlet, lower than atmospheric pressure. Possibly it also creates a pressure near the axis of the water outlet that is also less than atmospheric, but whether less or not, there is an appreciably higher condition of pressure near the axis than is produced at the edge of the water nozzle. This differential in pressure causes the water at the center or near the axis of the nozzle to move outwardly from the region of higher pressure to the region of lower pressure at the nozzle edge. At the same time the water leaving the outlet and coming into direct contact with the very rapidly moving air is speeded-up and because of the cohesion between the water molecules this speeding-up is transmitted as a sort of pulling effect on the water still within the nozzle, causing the outer portion of the stream to accelerate and the water near the center of the stream to move outwardly toward the inner wall of the nozzle. And the adhesion between this wall and the water aids also in the spreading of the solid stream. These several influences, the differential of pressure, the increase in velocity, the cohesion betwen the water molecules and the adhesion between the wall surface and the water, all cooperate to transform the solid stream into a coherent hollow stream just short of the edge of the nozzle so that the water actually leaves the discharge outlet as a thin clear hollow annular film. This is very promptly changed into attenuated filaments and as they become drawn out they break up under the influence of surface tension into minute particles so small and light as to float along in the air until absorbed thereby. Thus is produced the desired colloidal-like state or degree of atomization which characterizes the practice of my improved method.

It is advantageous from the standpoint of quality of fog to have the wall at the discharge end of the liquid nozzle as thin as practical. In Figs. 1 and 2 I have shown a nozzle with its integral end provided with a thin wall 40 of sufficient axial extent to enable the improved method to be satisfactorily practiced. In Figs. 3 and 4 the thin wall 40' is provided by a tubular end inserted in the body of the water nozzle.

It is advantageous from the standpoint of quality of fog to have the wall at the discharge end of the liquid nozzle as thin as practical. In Figs. 1 and 2 I have shown a nozzle with its integral end provided with a thin wall 40 of sufficient axial extent to enable the improved method to be satisfactorily practiced. In Figs. 3 and 4 the thin wall 40' is provided by a tubular end inserted in the body of the water nozzle.

I claim:

1. The method of atomizing a liquid into an internal colloidal phase and mingling it with a gaseous external phase by the influence of a fast moving stream of fluid of a gaseous nature, which method comprises forming, prior to its entering the gaseous external phase, a relatively slow moving solid stream of liquid of such size relative to the size of the said fast moving stream of fluid and in such proximity to the latter stream that the said solid stream is changed into a faster moving hollow coherent stream, followed by subjecting the said hollow stream as it enters the gaseous external phase to contact with said stream of fluid to draw the said hollow stream of liquid into attenuated filaments which under the influence of surface tension break up into minute droplets, and dispersing said droplets in the external gaseous phase substantially without contact between the droplets.

2. The method of atomizing a liquid into an internal colloidal phase and mingling it with a gaseous external phase which comprises providing a rapidly moving stream of atomizing fluid of a gaseous nature in aspirating relation with a relatively slow moving solid stream of the liquid of such size relative to the size of the said fast moving stream of fluid and in such proximity to the latter stream that the said solid stream of liquid is changed into a faster moving hollow coherent stream during aspiration before the liquid reaches the external gaseous phase, and subjecting the said hollow stream of liquid upon entering the gaseous external phase to said rapidly moving stream of fluid to thereby finely atomize the liquid and disperse it in the gaseous external phase.

3. The method of breaking up a liquid into the internal phase of the colloidal state which comprises subjecting a slowly moving solid stream of the liquid to a fast moving stream of fluid of a gaseous nature arranged in aspirating relation to the liquid before said liquid meets the gaseous external phase and in atomizing and dispersing relation as the liquid enters the external phase, which method comprises forming the said solid stream of liquid of such size relative to the size of the fast moving stream of fluid and in such proximity to the latter stream that the said solid stream of liquid is changed into a faster moving coherent hollow stream by the aspirating effect of the fluid prior to the liquid entering the gaseous external phase.

4. The method of atomizing a liquid which comprises drawing the liquid, by the aspirating influence of a fast moving stream of fluid of a gaseous nature, into a cylindrical passage of such size relative to the size of the fast moving stream of fluid and in such proximity to the latter stream that the said solid stream of liquid emerges from the open end of the passage as a faster moving cylindrical coherent hollow stream of liquid, and directing said fast moving stream of fluid against said emerged hollow stream at such an angle to its axis and with sufficient energy as to atomize the liquid without causing detrimental convergence of the liquid toward said axis before, during, or after atomization.

5. The method of atomizing a liquid which comprises drawing the liquid, by the aspirating influence of a fast moving stream of fluid of a gaseous nature, as a slow moving solid stream into a passage of such size relative to the size of the fast moving stream of fluid and in such proximity to the latter stream that the velocity of the liquid is increased within the passage and the solid stream is changed into a faster moving cylindrical coherent hollow stream of liquid, and subjecting said hollow stream to the atomizing effect of the said fast moving stream of fluid as the liquid emerges from the passage.

ALBERT J. LOEPSINGER.